(12) United States Patent
Arai et al.

(10) Patent No.: US 7,520,921 B2
(45) Date of Patent: Apr. 21, 2009

(54) GAS-REMOVING DEVICES AND AIR SUPPLY SYSTEMS HAVING THE GAS-REMOVING DEVICES

(75) Inventors: Yasunari Arai, Kariya (JP); Akishi Morita, Kariya (JP); Nobuhiko Nakagaki, Kariya (JP)

(73) Assignees: Toyota Boshoku Kabushiki Kaisha, Aichi (JP); SNT Co., Ltd., Chiba (JP)

( * ) Notice: Subject to any disclaimer, the term of this patent is extended or adjusted under 35 U.S.C. 154(b) by 406 days.

(21) Appl. No.: 10/586,315

(22) PCT Filed: Jan. 14, 2005

(86) PCT No.: PCT/JP2005/000735

§ 371 (c)(1),
(2), (4) Date: Jul. 14, 2006

(87) PCT Pub. No.: WO2005/071785

PCT Pub. Date: Aug. 4, 2005

(65) Prior Publication Data

US 2007/0157815 A1    Jul. 12, 2007

(30) Foreign Application Priority Data

Jan. 16, 2004    (JP)    ............... 2004-009315

(51) Int. Cl.
B01D 53/04    (2006.01)
H01M 8/06    (2006.01)
(52) U.S. Cl. .............. 96/135; 96/154; 55/527
(58) Field of Classification Search ........... 96/134, 96/135, 153, 154; 55/527; 429/12, 19
See application file for complete search history.

(56) References Cited

U.S. PATENT DOCUMENTS

| | | | | |
|---|---|---|---|---|
| 4,080,791 | A * | 3/1978 | Nadler et al. | 60/670 |
| 5,595,949 | A * | 1/1997 | Goldstein et al. | 502/20 |
| 5,626,820 | A * | 5/1997 | Kinkead et al. | 422/122 |
| 5,772,738 | A * | 6/1998 | Muraoka | 96/129 |
| 6,436,562 | B1 * | 8/2002 | DuBose | 429/13 |
| 6,638,339 | B2 * | 10/2003 | Dallas et al. | 95/90 |
| 7,138,008 | B2 * | 11/2006 | Stenersen et al. | 96/134 |
| 2003/0064271 | A1 | 4/2003 | Stenersen | |
| 2003/0096152 | A1 * | 5/2003 | Traver | 429/34 |
| 2003/0153457 | A1 | 8/2003 | Nemoto et al. | |

FOREIGN PATENT DOCUMENTS

| | | |
|---|---|---|
| EP | 1 402 933 A1 | 3/2004 |
| JP | 10-235129 | 9/1998 |
| JP | 2000-334229 | 11/1999 |

* cited by examiner

*Primary Examiner*—Frank M Lawrence
(74) *Attorney, Agent, or Firm*—Patterson, Thuente, Skaar & Christensen, P.A.

(57) ABSTRACT

A gas-removing device serves to remove impurity gases from the air supplied to a fuel cell via an air supply system. The gas-removing device includes a porous material and an alternate adsorption membrane. The porous material has micropores formed therein in order to absorb impurity gas particles contained in the air. The alternate adsorption membrane is formed on the inner walls of the micropores of the porous material in order to further adsorb and retain at least one type of impurity gas particles from among the impurity gas particles absorbed by the porous material. The alternate adsorption membrane includes at least one positively charged layer and at least one negatively charged layer laid alternately to one another.

7 Claims, 4 Drawing Sheets

GAS-REMOVING DEVICES AND AIR SUPPLY SYSTEMS HAVING THE GAS-REMOVING DEVICES

This application claims priority to Japanese application serial number 2004-009315, which application is hereby incorporated by reference herein in its entirety.

BACKGROUND OF THE INVENTION

1. Field of the Invention

The present invention relates to gas-removing devices for removing impurity gases from the air that may be supplied to a fuel cell via an air supply system. The present invention also relates to air supply systems having such gas-removing devices. The fuel cell is known to generate electric energy by utilizing an electrochemical reaction of a fuel gas to the oxygen contained in the air.

2. Description of the Related Art

A conventional gas-removing device is taught in Japanese Laid-Open Patent Publication No. 7-94200. As shown in FIG. 5, a gas-removing device 90 of this publication is provided in the air supply system 94 for a fuel cell 92. The gas-removing device 90 is used for removing impurity gases, such as organic solvent gases, contained in the air via the use of a container (not shown) filled with activated carbon. Therefore, to a certain degree it is possible to prevent the potential deterioration of an electrolyte of the fuel cell 92 due to chemical reactions between the electrolyte and the impurity gases that may be contained in the air.

In order to remove the impurity gases from the air the gas-removing device 90 of the above publication is constructed so as to absorb impurity gas particles into a number of micropores formed in the activated carbon. However, the impurity gas particles may not be effectively immobilized within the micropores. When the temperature changes or the flow rate of the air changes the impurity gas particles may become dissociated from the micropores and begin to flow again along with the flow of the air.

SUMMARY OF THE INVENTION

It is accordingly an object of the present invention to provide techniques that can prevent or minimize the dissociation of impurity gases after their absorption into the micropores of an absorption material, in order to improve the efficiency and effectiveness of the removal of the impurity gasses.

According to a first aspect of the current invention, gas-removing devices are taught for removing impurity gases from the air. The air may be supplied to a fuel cell via an air supply system. The fuel cell may generate electric energy by an electrochemical reaction between a fuel gas and the oxygen contained in the air. The gas removing devices include a porous material and a membrane formed on the inner walls of micropores formed in the porous material. The micropores absorb impurity gas particles contained in the air. The membrane may retain at least one type of the impurity gas particles absorbed by the porous material and may be an alternate adsorption membrane that has at least one positively charged layer and at least one negatively charged layer alternately laminated together.

Here, the term "absorb" is used to broadly include "adsorb", "attract", "capture," and "trap." The term "adsorb" is used primarily to differentiate between absorption via the micropores and further absorption via the membrane, i.e., the alternate adsorption membrane.

When the impurity gas particles are absorbed into the micropores of the porous material the impurity gas particles (hereinafter called "specific impurity gas particles") are then further adsorbed (retained) by the alternate adsorption membrane. Therefore, the specific impurity gas particles may not become easily dissociated from the micropores of the porous material, irrespective of a change in the temperature or a change in the flow rate of the air. As a result, there is an improvement in the efficiency of removing the specific impurity gases from the air.

In one embodiment, the impurity gas particles adsorbed by the alternate adsorption membrane include $SO_X$ gas particles and $H_2S$ gas particles. With this embodiment, at least the $SO_X$ gas particles and the $H_2S$ gas particles are adsorbed. By limiting the kinds of the specific gas particles in this way, the number of the charged layers of the alternate adsorption membrane can be reduced so as to minimize the manufacturing costs. In addition, the $SO_X$ gas and the $H_2S$ gas are known to significantly deteriorate the electrolyte of the fuel cell. Removing at least these gases can effectively extend the life of the fuel cell.

In another aspect of the present teachings, the porous material is activated carbon fiber. In general, the micropores of the activated carbon fibers have an average diameter of about 2.5 nm and are directly open at the outer surfaces of the fibers. Therefore, the impurity gas particles contained in the air may be rapidly and directly absorbed into the micropores when the air flows along the surfaces of the activated carbon fibers.

In one embodiment, the activated carbon fibers are formed into a non-woven fabric. Therefore, the gas-removing device can be easily mounted to a suitable member, such as the filter element of an air cleaner in the air supply system.

In another embodiment, the gas-removing device further includes resin fibers mixed with the activated carbon fibers to form the non-woven fabric. Alternatively, the resin fibers may be formed into at least two non-woven fabrics such that the non-woven fabric of the activated carbon fiber can be interleaved between the two non-woven fabrics.

In a further aspect of the present teachings, the porous material is an activated carbon granule. In one embodiment, the gas-removing device further includes resin fibers in a form of a non-woven fabric that encloses the activated carbon granules.

In a still further aspect of the present teachings, air supply systems are taught that include the gas-removing device, an air cleaner, and a compressor. The air cleaner is disposed on an upstream side of the gas-removing device and has a filter element that serves to remove dust and/or oil particles from the air. The compressor is disposed on the downstream side of the gas-removing device. The compressor serves to compress the air and to supply the compressed air to the fuel cell.

With this arrangement, dust and/or oil particles contained in the air may not obscure or block the micropores because they are removed by the filter element of the air cleaner that is disposed on the upstream side of the gas-removing device. Further, audible pulsation sounds that may be produced by the compressor may not significantly leak to the outside environment via the inlet of the compressor because the gas-removing device is disposed on the upstream side of the compressor and aids in inhibiting the transmission of these sounds.

In a still further aspect of the present teachings, the air cleaner has a housing for accommodating the filter element. A sound deadening space is defined within the housing on the downstream side of the filter element. The gas-removing device is disposed within the sound deadening space of the housing. Therefore, the housing serves to accommodate the air cleaner and also serves to accommodate the gas-removing device. Consequently, the manufacturing costs of the air supply system can be reduced.

BRIEF DESCRIPTION OF THE DRAWINGS

Additional objects, features and advantages of the present invention will be readily understood after reading the following detailed description together with the claims and the accompanying drawings, in which:

DESCRIPTION OF PREFERRED EMBODIMENT

Figure 1:
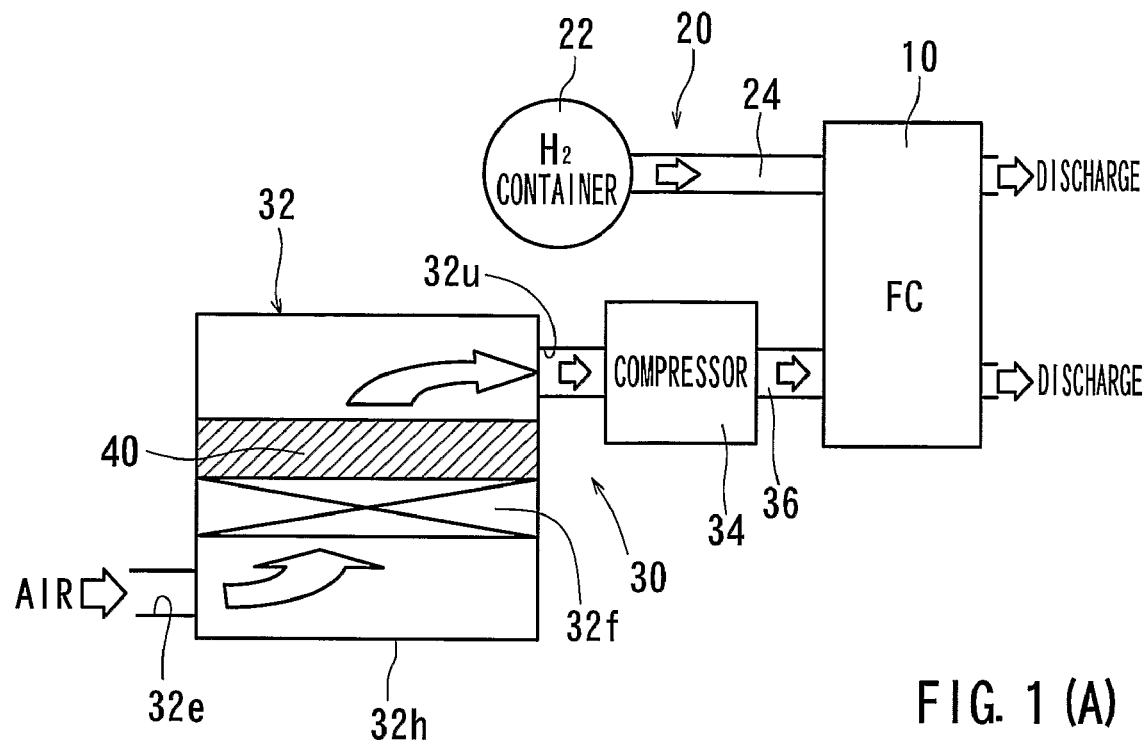
FIG. 1(A) is a schematic view of an air supply system that is adapted to supply air to a fuel cell and includes a gas-removing device according to one embodiment of the present invention.
FIG. 1(B) is a schematic view of the fuel cell.
Figure 1:
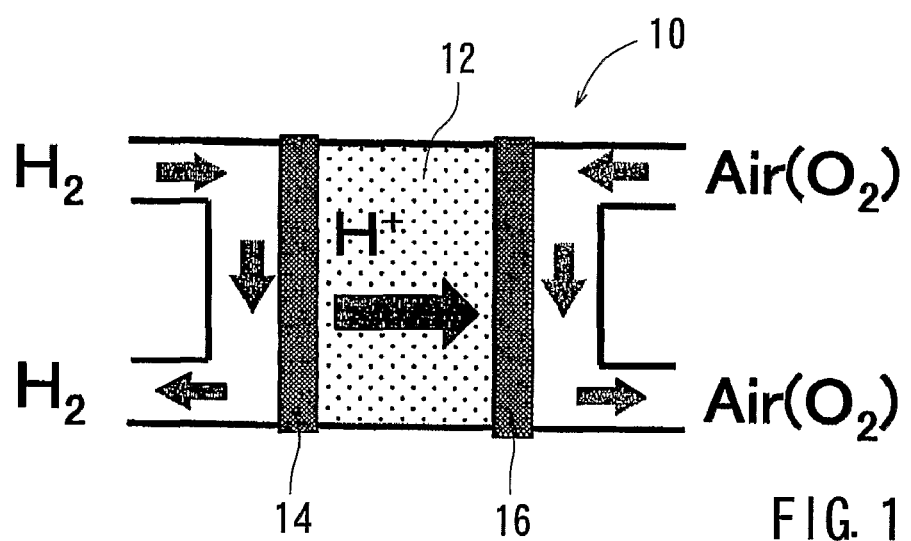
Figure 2:
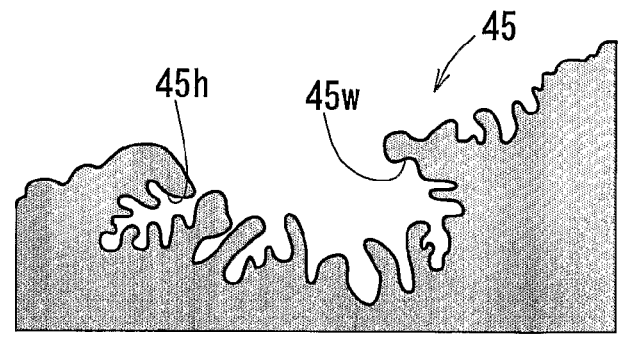
FIG. 2(A) is an enlarged schematic sectional view of a surface structure of an activated carbon granule used as a porous material of the gas-removing device.
FIG. 2(B) is an enlarged view of a portion B in FIG. 2(C)
FIG. 2(C) is an enlarged schematic sectional view of a surface structure of an activated carbon fiber used as a porous material of the gas removing device.
Figure 2:
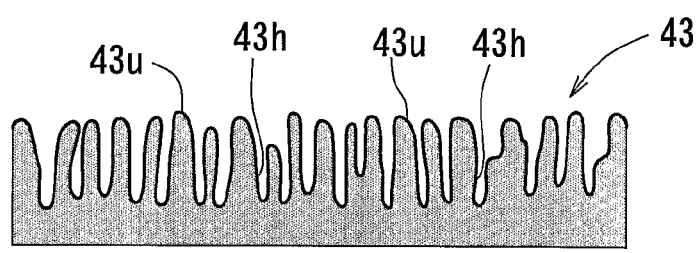
Figure 2:
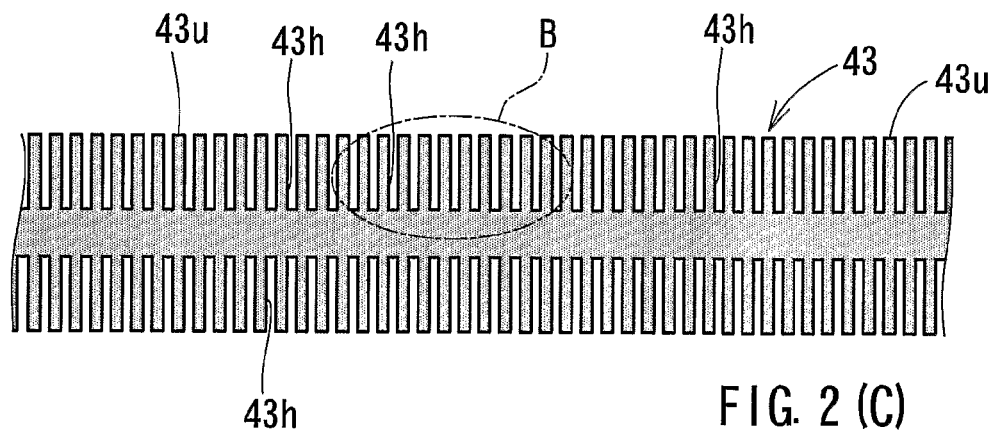
Figure 3:
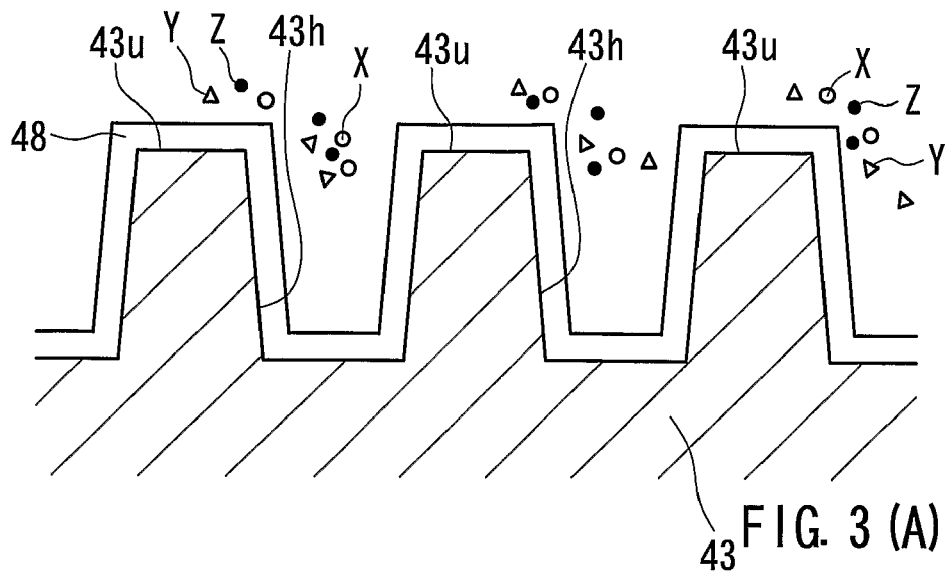
FIGS. 3(A) to 3(C) are views showing the operations of an alternate adsorption membrane formed on the porous material.
Figure 3:
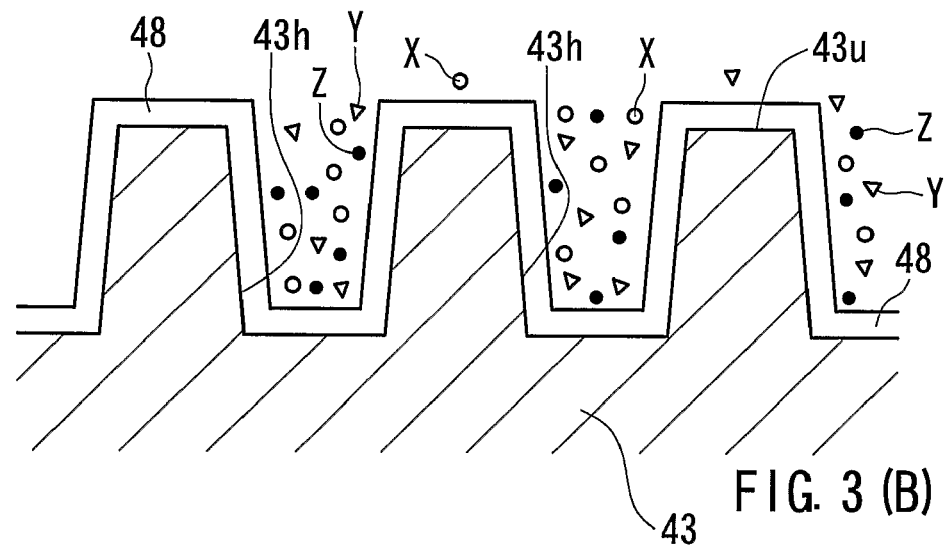
Figure 3:
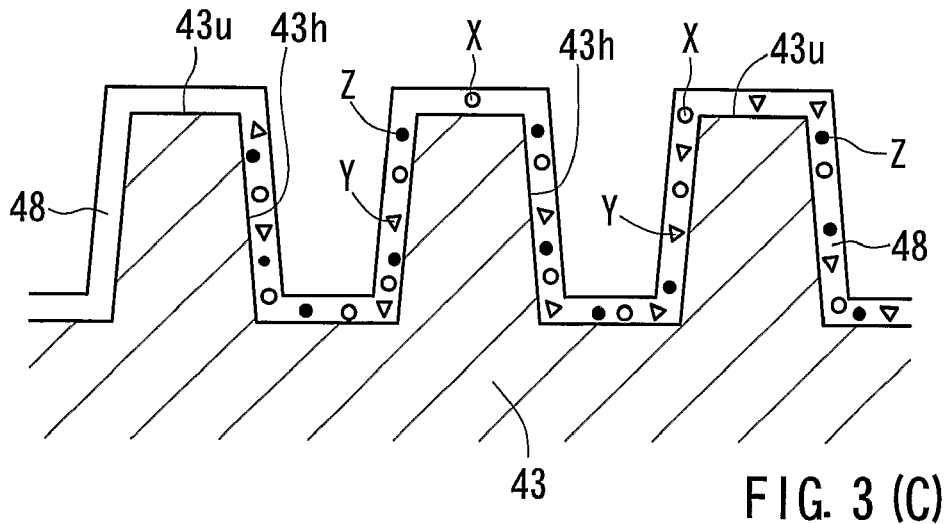

A representative embodiment will now be described with reference to FIGS. 1(A) and 1(B) through FIG. 4. As schematically shown in FIG. 1(A), a gas-removing device 40 is provided in an air supply system 30 in order to remove impurity gases from air that is supplied to a fuel cell 10. The fuel cell 10 may be used as a power source of a fuel cell powered vehicle (not shown).

The fuel cell 10 will be described in advance of a description of the gas-removing device 1. The fuel cell 10 generates electric energy via an electrochemical reaction between hydrogen (i.e., a fuel gas) and the oxygen contained in the air. As shown in FIG. 1(B), the fuel cell 10 includes an anode 14, a cathode 16, and an electrolyte 12 interleaved between the anode 14 and the cathode 16. The anode 14 receives a supply of hydrogen gas from a fuel gas supply system 20. The cathode 16 receives a supply of air (i.e., an oxygen gas) from the air supply system 30.

As shown in FIG. 1(A), the fuel gas supply system 20 includes a hydrogen gas container 22 for storing the hydrogen gas, a gas pressure regulator (not shown) for regulating the pressure of the hydrogen gas supplied from the hydrogen gas container 22, and a pipeline 24 that serves to deliver the hydrogen gas to the fuel cell 10.

The air supply system 30 includes an air cleaner 32 for filtrating the air entering from the outside of the vehicle, a compressor 34 for pressurizing or compressing the air that has passed through the air cleaner 32, and an air pipeline 36 that serves to deliver the compressed air to the fuel cell 10.

The air cleaner 32 of the air supply system 30 has a housing 32h. An inlet port 32e and an outlet port 32u are formed in the housing 32h. A filter element 32f is disposed within the housing 32h in order to remove dust and oil particles from the air. The representative gas-removing device 40 is mounted within a sound deadening space that is defined within the housing 32h on the downstream side of the filter element 32f.

The air naturally contains impurity gasses. Therefore, the gas-removing device 40 is used for removing the impurity gasses, such as an $SO_X$ gas, an $H_2S$ gas, and an $NO_X$ gas, from the air. The gas-removing device 40 is configured as a non-woven fabric that is formed by activated carbon fibers.

One of the activated carbon fibers is partly shown in FIG. 2(C) and is labeled with reference number 43. The activated carbon fiber 43 may be a thin fiber having a diameter in the range from about 10 μm to 20 μm. As shown in FIG. 2(C), a number of micropores 43h are formed in the activated carbon fiber 43. The micropores 43h may have an average diameter equal to or less than about 2.5 nm. In FIG. 2(C), the activated carbon fiber 43 is shown in a sectional view in a longitudinal direction. An enlarged view of a portion "B" marked in FIG. 2(C) is shown in FIG. 2(B). The enlarged view shows the micropores 43h in configurations that are closer to their actual configurations.

In general, when a fluid contacts with the surface of a solid material, substances contained in the fluid may move towards the surface of the solid material. As a result, the concentration of the substances contained in the fluid in a location close to the surface of the solid material may become higher than the concentration of the substances in other locations. Assuming that the solid material in this representative embodiment is an activated carbon fiber 43, the surface of the solid material may include the inner walls of the micropores 43h. The fluid may be air that contains the impurity gas particles as the substances. Therefore, the impurity gas particles contained in the air may move toward the inner walls of the micropores 43h so as to be absorbed into the micropores 43h. In other words, when the air flows through the activated carbon fiber 43, the impurity gas particles contained in the air may be absorbed into the micropores 43h of the activated carbon fiber (absorption effect).

As shown in FIGS. 3(A) to 3(C), an alternate adsorption membrane 48 may be formed on the surface of the activated carbon fiber 43. Here, the surface includes an outer surface 43u directly exposed to the outside, and the inner walls of the micropores 43h. For the purposes of illustration, the alternate adsorption membrane 48 is not shown in FIGS. 2(A) to 2(C).

The alternate adsorption membrane 48 may chemically adsorb specific gas particles, such as $SO_X$ gas particles, $H_2S$ gas particles, and $NO_X$ gas particles, from among the impurity gas particles that may be contained in the air and may be absorbed into the micropores 43h. Due to the function of the alternate adsorption membrane 48, the specific gas particles absorbed into the micropores 43h may not readily move to the area outside of the micropores 43h, even if the environmental temperature has changed or the flow rate of the air has changed.

Figure 4:
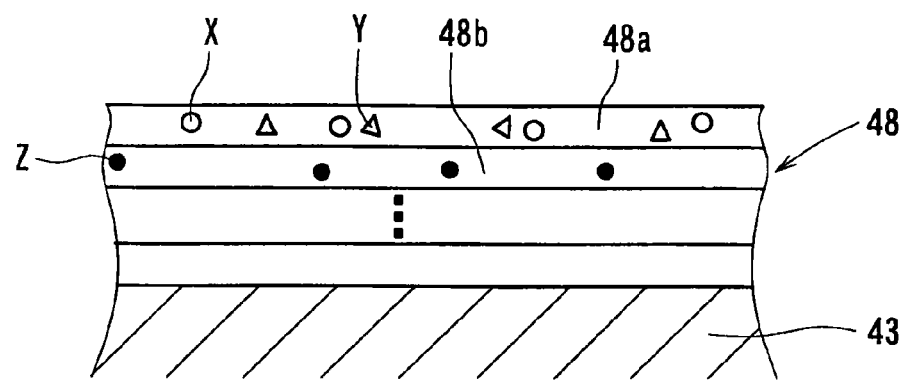
FIG. 4 is an enlarged sectional view of the alternate adsorption membrane.

In general, alternately laying positively charged layers and negatively charged layers manufactures an alternate adsorption membrane. In this representative embodiment, a first charged layer 48a and a second charged layer 48b are alternately laid to form the alternate adsorption membrane 48, as shown in FIG. 4. The first charged layers 48a may adsorb $SO_X$ gas particles X and $NO_X$ gas particles Y. The second charged layers 48b may adsorb the $H_2S$ gas particles Z.

The material and method of manufacturing such an alternate adsorption membrane are disclosed in Japanese Laid-Open Patent Publication No. 2000-334229. The followings are extracts from the description in this publication with regard to the material and method of manufacturing an alternate adsorption membrane.

Method of Manufacturing Alternate Adsorption Membrane

In one embodiment disclosed in this publication, in order to manufacture an alternate adsorption membrane, poly-allylaminehydrochloride (PAH) having a molecular weight of 55000 is used as a positive electrolyte polymer and poly-acrylic acid (PAA) having a molecular weight of 90000 is used as a negative electrolyte polymer. An aqueous solution of poly-allylaminehydrochloride (PAH) of $10^{-2}$ mol/l concentration and an aqueous solution of poly-acrylic acid (PAA) of $10^{-2}$ mol/l concentration are prepared and respectively stored in a first vessel 100 and a second vessel 200 as shown in FIG. 1 of this publication. In addition ultra-purified water having a resistance of more than 18 MΩ-cm was prepared as a purified water used for a rinsing bath or the like.

Figure 5:
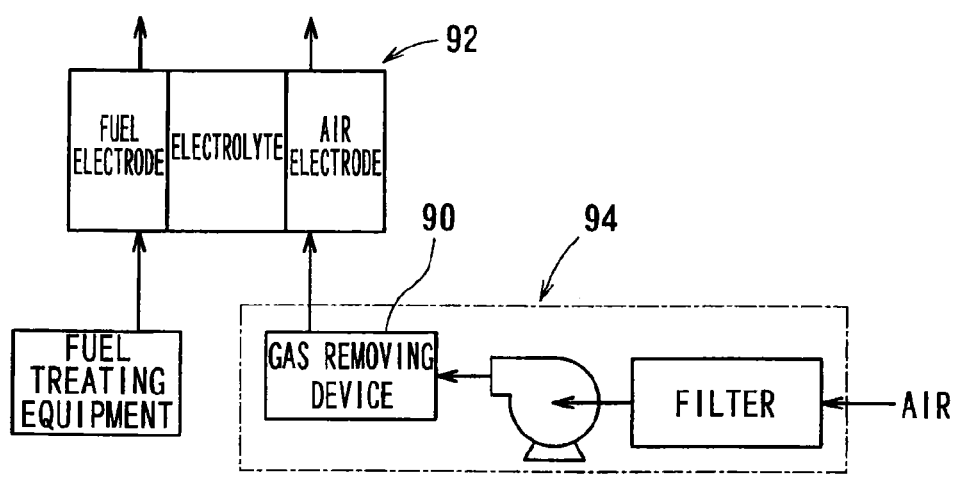
FIG. 5 is a schematic view of a conventional air supply system for supplying air to a fuel cell.

A glass fiber mat 30 shown in FIG. 5 of the publication is used as a substrate of the alternate absorption membrane. The glass fiber mat 30 was rinsed by ethanol and was dipped into a mixture of sulfuric acid and hydrogen peroxide solution for a duration of one hour. The glass fiber mat 30 was further dipped into a mixture of aqueous ammonia and hydrogen peroxide solution. Then, the glass fiber mat 30 was again rinsed by the purified water and thereafter dried, so that hydrophilic treatment of the surface of the glass fiber mat 30 can be performed and the surface of the glass fiber mat 30 can be negatively charged due to incorporation of a hydroxyl group.

The glass fiber mat 30 thus prepared was alternately immersed into the first vessel 100 and the second vessel 200 in order to form an alternate adsorption membrane 20 on the surfaces of the glass fibers. Each time that the glass fiber mat 30 taken out from one vessel was transferred to another vessel, the glass fiber mat 30 was passed thorough the ultra-pure water bath. The dipping time in each vessel was controlled such that each layer of the alternate adsorption membrane 20 has a thickness of about 10 to 40 nm. Consequently, the alternate adsorption membrane 20 was formed so as to have from 60 to 360 layers. The observation of the detailed surface structure of the alternate adsorption membrane by an atomic force microscope has confirmed that each charged layer has polymer chains that are intricately intertwined with each other in order to provide a porous structure sufficient for permitting permeation of particles having a diameter of up to 0.1 μm.

Material of Alternate Adsorption Membrane

In place of PAH described above, polypyrrole, polyaniline, polyparaphenylene (+), polyparaphenylenevinylene, and polyethylimine may be used as a positive electrolyte polymer. In addition, in place of PAA described above, polyparaphenylene (−), polystyrene sulfonic acid, polythiophene-3-acetic acid, polyamic acid, and polymethacrylic acid may be used as a negative electrolyte polymer.

The above method and the material disclosed in the publication can be used for manufacturing the alternate adsorption membrane 48 of the representative embodiment of the present invention. Adding additional charged layers chosen so as to adsorb different gas particles may increase the number of types of gas particles adsorbed by the alternate adsorption membrane 48.

The operation of the gas-removing device 40 will now be described in relation to the operation of the air supply system 30.

First, the compressor 34 of the air supply system 30 is driven so as to draw the air outside of the vehicle into the housing 32h via the inlet port 32e of the air cleaner 32. Any dust and oil particles contained in the air drawn into the housing 32h may then be removed from the air as the air passes through the filter element 32f. After passing through the filter element 32f, the air may flow into the gas-removing device 40. As the air passes through the gas removing device 40, particles of impurity gasses contained in the air may be absorbed into the micropores 43h formed in the activated carbon fiber 43, as shown in FIGS. 3(A) and 3(B). Then, the specific gas particles, or the $SO_X$ gas particles X, the $NO_X$ gas particles Y, and the $H_2S$ gas particles Z from among the absorbed impurity gas particles, may be selectively chemically adsorbed by the alternate adsorption membrane 48, as shown in FIG. 3(C). Consequently, the $SO_X$ gas particles X and the $NO_X$ gas particles Y may be adsorbed by the first layer 48a of the alternate adsorption membrane 48, while the $H_2S$ gas particles Z may be adsorbed by the second layer 48b, as shown in FIG. 4.

In this way, the $SO_X$ gas particles X, the $NO_X$ gas particles Y, and the $H_2S$ gas particles Z, may be removed from the air as the air passes through the gas-removing device 40. After passing through the gas-removing device 40, the air may flow into the compressor 34 via the outlet port 32u. The air may then be compressed to a predetermined pressure and subsequently delivered to the cathode 16 of the fuel cell 10.

Thus, the air may be delivered to the fuel cell 10 from which the $SO_X$ gas particles X, the $NO_X$ gas particles Y, and the $H_2S$ gas particles Z have been removed. Therefore, it is possible to prevent or minimize possible deterioration of the electrolyte 12 of the fuel cell 10 caused by impurity gasses. As a result, the life of the fuel cell 10 can be extended.

In addition, as described previously, according to the representative gas-removing device 40, the alternate adsorption membrane 48 covers the inner walls of the micropores 43h of the activated carbon fiber 43. Therefore, the alternate adsorption membrane 48 selectively chemically adsorbs specific impurity gas particles (such as the $SO_X$ gas particles) from among the impurity gas particles absorbed by the micropores 43h. After adsorption, the specific gas particles may not readily move away from the micropores 43h irrespective of a change in the environmental temperature or a change in the flow rate of the air. As a result, there is an improvement in the removing efficiency of the specific impurity gases contained in the air.

Further, in this representative embodiment, the activated carbon fibers 43 serve as a porous material having micropores 43h. The micropores 43h have an average diameter equal to or less than about 2.5 nm and directly open at the outer surface of the activated carbon fibers 43. Therefore, the impurity gas particles may be rapidly absorbed into the micropores 43h.

Furthermore, any dust or oil particles that may be contained in the air may not obstruct or block off the micropores 43h because the gas-removing device 40 is disposed on the downstream side of the filter element 32f of the air cleaner 32. In addition, any pulsation sounds produced by the compressor 34 may be inhibited from being transmitted to the outside environment via the inlet of the compressor because the gas-removing device 40 is disposed on the upstream side of the compressor 34.

Still furthermore, the gas-removing device 40 is disposed within the sound deadening space defined in the housing 32h for accommodating the air cleaner 32. In other words, the air cleaner 32 and the gas-removing device 40 are accommodated within a common housing, i.e., the housing 32h. As a result, the manufacturing cost of the air supply system 30 can be reduced.

In the representative embodiment described above, non-woven fabric formed by activated carbon fibers 43 mainly constitutes the gas-removing device 40. However, a mixture of activated carbon fibers 43 and resin fibers may form the non-woven fabric. In addition, the gas-removing device 40 may include another non-woven fabric formed by resin fibers. For example, the non-woven fabric formed by activated carbon fibers 43 may be interleaved between two layers of non-woven fabric formed by resin.

In addition, although the activated carbon fibers 43 are used as a porous material in the above representative embodiment, other forms such as activated carbon granules may be used in place of the activated carbon fibers 43. In such a case, a non-woven fabric formed by resin fibers may preferably enclose the activated carbon granules.

FIG. 2(A) shows an enlarged sectional view of a part of an activated carbon granule 45 that may be used as a porous material of the present invention. As shown in FIG. 2(A), a number of pores 45w are formed in the outer surface of the activated carbon granule 45. In general, the pores 45w (only one pore 45w is shown in FIG. 2(A)) may have an average diameter of about 100 μm. A number of micropores 45h are formed to extend from the inner wall of each pore 45w. Therefore, the impurity gas particles, such as $SO_X$ gas particles, $H_2S$ gas particles, and $NO_X$ gas particles contained in the air, may first enter the pores 45w and may then be absorbed into the micropores 45h. In this way the activated carbon granules 45 may function in the same manner as the activated carbon fibers 43, although the time necessary for absorbing the impurity gas particles may be longer than the time required for absorbing the impurity gas particle via by the activated carbon fibers 43.

Further, in the above representative embodiment, the filter element 32f of the air cleaner 32 is separated from the gas-removing device 40. However, the filter element 32f and the gas-removing device 40 may be configured together as an integral module.

Lastly, the number of types of gas particles adsorbed by the alternate adsorption membrane 48 may be increased by adding additional charged layers chosen so as to adsorb different types of gas particles, although the alternate adsorption membrane 48 is designed to adsorb the particles of $SO_X$ gas, $H_2S$ gas, and $NO_X$ gas in the representative embodiment.

The invention claimed is:

1. An air supply system for supplying air to a fuel cell, wherein the fuel cell generates electric energy by an electrochemical reaction between a fuel gas and oxygen contained in the air, the air supply system comprising:

an air cleaner disposed on an upstream side of the fuel cell and having housing;
    a filter element disposed within the housing of the air cleaner and arranged and constructed to remove dust particles from the air; and
    a gas-removing device disposed within the housing of the air cleaner on the downstream side of the filter element and arranged and constructed to remove impurity gases from the air;
    wherein the gas-removing device comprises:
    activated carbon fibers having micropores formed therein in order to absorb impurity gas particles contained in the air, the micropores having inner walls; and
    an alternate adsorption membrane formed on the inner walls of the micropores of each of the activated carbon fibers in order to further adsorb at least one type of impurity gas particles from among the impurity gas particles absorbed by the porous material, the alternate adsorption membrane comprising at least one positively charged layer and at least one negatively charged layer alternately laid together.

2. The air supply system as in claim 1, wherein the activated carbon fibers include those having micropores that are directly exposed to the outside of the activated carbon fibers.

3. The air supply system as in claim 1, wherein the activated carbon fibers are formed into a non-woven fabric.

4. The air supply system as in claim 3, wherein the gas removing device further includes resin fibers mixed with the activated carbon fibers to form the non-woven fabric.

5. The air supply system as in claim 3, wherein the gas removing device further includes resin fibers formed into at least two non-woven fabrics, and
    wherein the non-woven fabric of the activated carbon fibers is interleaved between the two non-woven fabrics.

6. The air supply system as in claim 1, further comprising a compressor disposed on a downstream side of the air cleaner and arranged and constructed to compress the air and to supply the compressed air to the fuel cell.

7. The air supply system as in claim 6,
    wherein a sound deadening space is defined in the housing of the air cleaner on the downsteam side of the filter element; and
    wherein the gas-removing device is disposed within the sound deadening space of the housing.

* * * * *